Sept. 9, 1958 M. E. HALLADAY ET AL Re. 24,532

CUSHIONING STRUCTURE FOR HYDRAULIC CYLINDERS

Original Filed Jan. 11, 1954

INVENTOR

Merton E. Halladay
Charles W. White

BY

ATTORNEY

United States Patent Office

Re. 24,532
Reissued Sept. 9, 1958

24,532

CUSHIONING STRUCTURE FOR HYDRAULIC CYLINDERS

Merton E. Halladay, Jackson, and Charles W. White, Clarklake, Mich., assignors to Tomkins-Johnson Company, Jackson, Mich., a corporation of Michigan Original No. 2,804,052, dated August 27, 1957, Serial No. 403,158, January 11, 1954. Application for reissue April 30, 1958, Serial No. 734,378

1 Claim. (Cl. 121—38)

Figure 1:
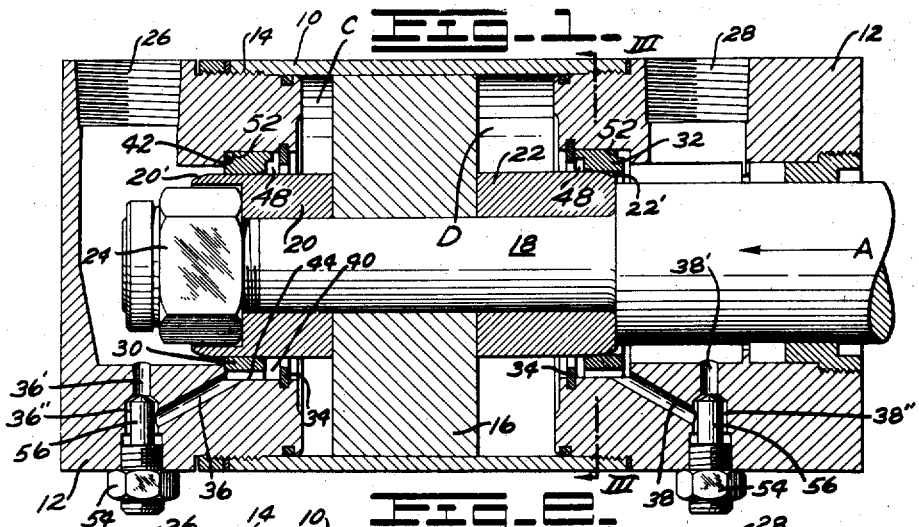

Matter enclosed in heavy brackets [ ] appears in the original patent but forms no part of this reissue specification; matter printed in italics indicates the additions made by reissue.

This invention relates to improvements in the means employed for cushioning and regulating the movement of reciprocated pistons actuated by a fluid, such as oil, air, and the like in which structure is employed, movable with the piston, to restrict the flow of the fluid moving ahead of the piston so as to cushion and regulate the movement as the piston reaches the end of its stroke in one direction or in the opposite direction.

It is an object of the invention to provide improved means for effecting such flow restricting and cushioning action in a simple yet efficient manner with the employment of the fewest number of parts, which can be standardised and manufactured without the need for close manufacturing tolerances and are capable of being readily installed, or replaced.

The above and other objects and advantages of the invention, residing in the construction, arrangement and combination of parts will appear clear from a consideration of the following descriptions with reference to the accompanying drawings and from the appended claim.

Figure 2:
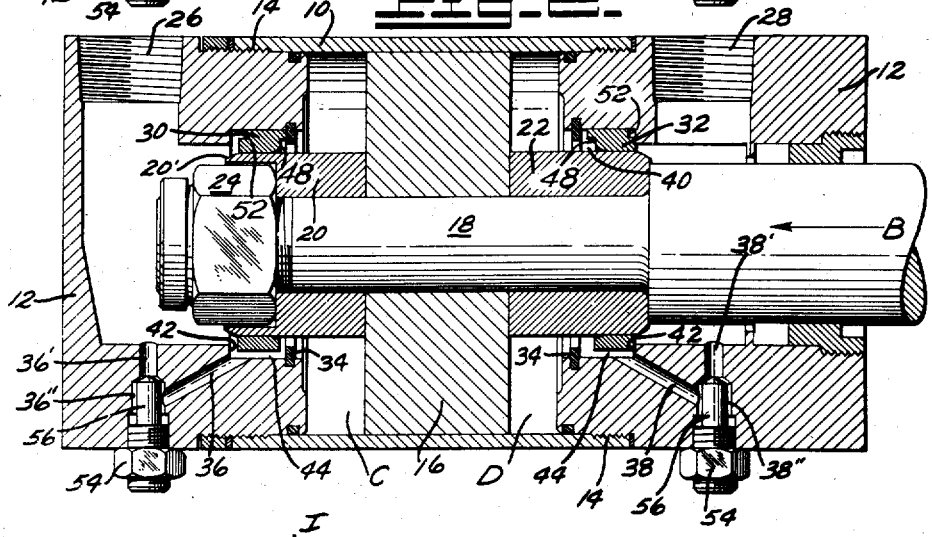
Figure 3:
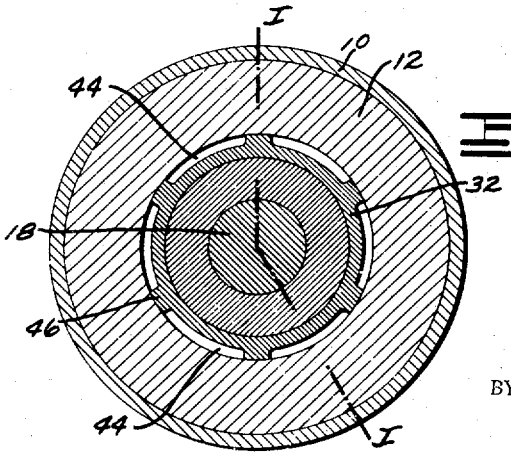

In the drawings:

Fig. 1 is a longitudinal section on the line I—I of Fig. 3 of a piston and cylinder assembly incorporating fluid flow restricting and cushioning means in accordance with the invention and shown in position when the piston is moved to the left, as indicated by the arrow A, Fig. 2 is a similar view to Fig. 1, but with the piston shown moved to the right, as indicated by the arrow B, and Fig. 3 is a cross section on the line III—III of Fig. 1.

Referring to the drawings 10 indicates the cylinder, which has heads 12 secured thereto at its opposite ends in any suitable manner, as by the screw-threading 14.

The piston, indicated at 16, is supported for reciprocation in the cylinder and has its piston rod 18, upon which sealing plugs 20 and 22 are secured so as to engage the opposite sides of the piston, with the nut 24 holding the parts in position.

To alternately direct fluid under pressure against opposite sides of the piston 16, any suitable conduit (not shown) connects the ports 26 and 28 with a source of the pressure fluid, there being a valve provided (not shown) for alternatively connecting these parts to receive the pressure fluid for admission against one side of the piston and for alternatively connecting them for exhaust of the pressure fluid. Thus, if the port 26 is connected to admit pressure fluid against the left-hand side of the piston the port 28 will be connected to exhaust the pressure fluid from the right-hand side of the piston, and vice versa.

The means provided for restricting the fluid and cushioning the piston movement as it reaches the end of its stroke in either direction comprise a pair of similar slotted rings 30 and 32, with associated stop rings 34, and restricted flow passages 36, 36′ and 38, 38′ provided in the left-hand and the right-hand piston heads 12, respectively.

The slotted rings 30 and 32 are mounted for axial movement within annular spaces 40 defined between the cylinder heads 12 and the piston rod plugs 20 and 22, their movement being limited by internal radial abutment surfaces 42 on each cylinder head and by the stop rings 34. These slotted rings also have some freedom of movement to float vertically within their confining spaces 40 and with respect to the said radial abutment surfaces 42, whereby to provide for a self centering movement of these rings in the piston cushioning movements and eliminate the necessity of providing precision concentric surfaces. The stop rings 34 are shown secured within annular recesses on the interior surfaces of the cylinder heads 12, and the piston plugs 20 and 22 are shown with bevelled end surfaces 20′ and 22′ which assist in leading the plugs into their respective slotted rings and effect the initial cushioning of the piston.

The slotted rings 30 and 32 are of similar construction, as will be seen from reference to the drawings. Each ring is formed on its exterior surface with a series of circumferentially spaced arcuate slots 44, which extend the full-axial extent of the rings and define axial fluid flow passages, the slots being separated by radial integral web portions 46 of the rings, which web portions have relative axial sliding and vertical floating movement with respect to the interior cylinder head surfaces.

On each side of each of the slotted rings, as presented to the corresponding stop ring, the rings are formed with internal counterbores 48 and on their opposite sides, as presented to the cylinder head abutment surfaces 42, the rings are formed with external counterbores 52.

The restricted fluid flow passages 36, 36′ and 38, 38′ communicate with intermediate passages 36″ and 38″, respectively, in which valve plugs 54 are located for adjustment by the nuts 56 so as to adjust the effective size of the opening between the passages 36″, 36′ and 38″, 38′. Such adjustment may be an initial set adjustment made to suit a particular cylinder and piston assembly.

In operation, with pressure fluid admitted through port 28 and port 26 being connected to exhaust, and having reference to Fig. 1, the pressure fluid will act against the slotted ring 32 to move it to the left against the corresponding stop ring 34. This opens up the slots 44 to a flow of the fluid from the port 28 to the right-hand side of the piston, with attendant movement of the piston to the left, insertion of the sealing plug 20 in the slotted ring 30, and seating of the slotted ring 30 against the abutment surface 42 on the left-hand cylinder head surface 42. This seating of the ring 30 gives rise to the formation of a restriction within the cylinder space C formed on the left-hand side of the piston, as seen in Fig. 1, due to the flow of the fluid from this cylinder space to the exhaust port 26 being constrained to take place through the restricted passageway 36, 36″, 36′ via the slots 44 in the ring 30. These slots 44, with the ring 30 floatingly seated against the said surface 42, will be open to a flow of the fluid from the cylinder space C but will be closed to the exhaust port 26 except through the said passages 36, 36″, 36′.

The reverse action takes place when the piston is moved to the right from the position seen in Fig. 1 to the position seen in Fig. 2, where the slotted rings 30 and 32 are shown reversed in position and the fluid cushion is formed in the cylinder space D on the right of the piston 16.

Having thus described our invention, what we claim as novel and desire to protect by Letters Patent is as follows:

A piston and cylinder assembly having a fluid cushion for cushioning the piston travel at the ends of its stroke comprising a cylinder for cylinder heads at opposite ends thereof, a centrally located bore defined in [each] *at least one* of said heads for the passage of actuating and exhaust fluids in opposite directions, a cylindrical piston disposed in said cylinder for actuation by differential fluid pressure on opposite sides of said piston and having a piston rod connected thereto, *a* cylindrical member[s] of lesser diameter than said piston and located upon [opposite sides] *the bore side* of said piston and [alternatively] movable into said bore[s] [of said heads] as the end of [each] *a* stroke of said piston is approached to restrict the passage of *exhaust* fluid through said bore[s], *a* ring valve[s] supported in said bore[s] for limited axial and radial movement, the internal diameter of said ring valve[s] approaching the external diameter of said cylindrical member[s] to provide a sliding seal between said ring valve[s] and said cylindrical member[s] and imparting limited movement to said ring valve[s] in the direction of piston movement, port structure defined along the periphery of said ring valve[s] for controlled passage of fluid through said bore[s], and abutment structure located in said bore[s] and providing a seat for said ring valve[s] for regulating said port structure upon axial movement of said ring valve[s], said abutment structure and said ring valve[s] coacting in said bore[s] and providing a seat for said ring valve[s] for regulating said port structure upon axial movement of said ring valve[s], and said cylindrical member[s] and said ring valve[s] coacting in said bore[s] to restrict the exhausting of fluid from said cylinder as the piston approaches from one direction the end of its stroke to provide a fluid cushion, upon piston movement in the opposite direction said ring valve[s] being axially moved to open said port structure for the admission of actuating fluid to said cylinder.

References Cited in the file of this patent or the original patent

UNITED STATES PATENTS

| | | |
|---|---|---|
| 1,956,758 | Ernst | May 1, 1934 |
| 2,493,602 | Sterrett | Jan. 3, 1950 |
| 2,556,698 | Loewe | June 12, 1951 |
| 2,704,996 | Peterson | Mar. 29, 1955 |
| 2,710,595 | Peterson | June 14, 1955 |
| 2,719,510 | Elder | Oct. 4, 1955 |